(12) United States Patent
Hsu

(10) Patent No.: US 6,171,061 B1
(45) Date of Patent: Jan. 9, 2001

(54) STRUCTURE OF A SUSPENDING BRACKET FOR CEILING FANS

(76) Inventor: Kuang-Hsiung Hsu, P.O. Box 82-144, Taipei (TW)

( * ) Notice: Under 35 U.S.C. 154(b), the term of this patent shall be extended for 0 days.

(21) Appl. No.: 09/361,556

(22) Filed: Jul. 27, 1999

(51) Int. Cl.[7] .................................................. B63H 7/00
(52) U.S. Cl. ......................................................... 416/244 R
(58) Field of Search .................................. 416/5, 210 R, 416/244 R; 248/221.11, 222.11, 343; 403/348, 322.2

(56) References Cited

U.S. PATENT DOCUMENTS

| | | | |
|---|---|---|---|
| 4,634,345 | * | 1/1987 | Stanek et al. ...................... 416/224 R |
| 5,151,011 | * | 9/1992 | Rezek ........................................ 416/5 |
| 5,613,832 | * | 3/1997 | Su .................................... 416/224 R |
| 5,947,436 | * | 9/1999 | Bucher ................................. 248/345 |
| 6,042,072 | * | 3/2000 | Chi-Nan ................................. 248/343 |

* cited by examiner

Primary Examiner—Edward K. Look
Assistant Examiner—Ninh Nguyen
(74) Attorney, Agent, or Firm—A & J

(57) ABSTRACT

A suspending bracket for ceiling fans includes a U-shaped upper member having a C-shaped base and two upright arms at two opposite sides of the C-shaped base, each of the upright arms being provided with an outwardly extending sectorial flange which is formed with a radial slot and a raised portion on the top, the sectorial flange having a corner formed with a blind hole in which is fitted a spring and a steel ball so that a top of the steel ball protrudes upwardly out of the blind hole, and an inverted conical lower member formed with two inwardly extending lugs at two opposite upper edges thereof and a through hole at a center thereof, each of the lugs having a hole adapted to engage with a top of the steel ball.

1 Claim, 4 Drawing Sheets

STRUCTURE OF A SUSPENDING BRACKET FOR CEILING FANS

BACKGROUND OF THE INVENTION

1. Field of the Invention

This invention is related to an improvement in the structure of a suspending bracket for ceiling fans and in particular to one which can be easily assembled.

2. Description of the Prior Art

It has been found that the conventional suspending bracket for ceiling fans is generally composed an upper member and a lower member. However, it is very difficult to align the holes of the lower member with the screws of the upper member and there is little space for turning the screws to engage the lower member with the upper member thereby causing much inconvenience in operation and therefore wasting time and money.

Therefore, it is an object of the present invention to provide an improvement in the structure of a suspending bracket for ceiling fans which can obviate and mitigate the above-mentioned drawbacks.

SUMMARY OF THE INVENTION

This invention is related to an improvement in the structure of a suspending bracket for ceiling fans.

According to a preferred embodiment of the present invention, a suspending bracket for ceiling fans includes a U-shaped upper member having a C-shaped base and two upright arms at two opposite sides of the C-shaped base, each of the upright arms being provided with an outwardly extending sectorial flange which is formed with a radial slot and a raised portion on the top, the sectorial flange having a corner formed with a blind hole in which is fitted a spring and a steel ball so that a top of the steel ball protrudes upwardly out of the blind hole, and an inverted conical lower member formed with two inwardly extending lugs at two opposite upper edges thereof and a through hole at a center thereof, each of the lugs having a hole adapted to engage with a top of the steel ball, whereby when in use, the U-shaped upper member is first secured, cured to a ceiling by extending screws through the radial slots so that there is a clearance between the sectorial flange and a ceiling, a suspending rod of a ceiling fan extends through the through hole of the inverted conical lower member to engage with a hemispherical block which is larger than the C-shaped base in diameter so that the hemispherical block will not drop out of the upper member, and thereafter, the lower member is moved upwardly and tuned to fit into the clearance so that the steel ball is engaged with the hole of the lugs thereby keeping the lower member in place.

It is the primary object of the present invention to provide an improvement in the structure of a suspending bracket for ceiling fans which can be easily assembled.

It is another object of the present invention to provide an improvement in the structure of a suspending bracket for ceiling fans which is simple in construction.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
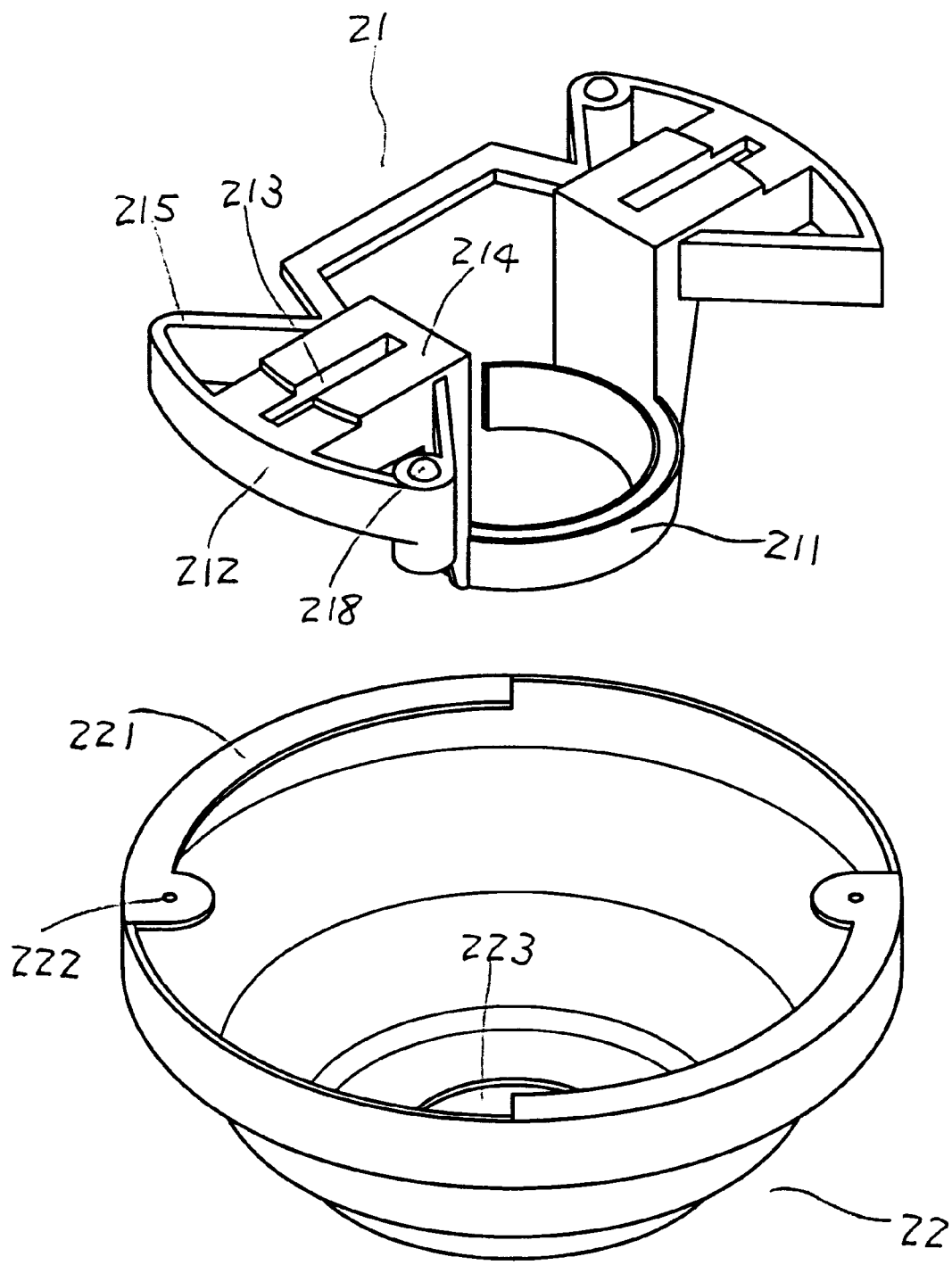
FIG. 1 is an exploded view of a suspending bracket for ceiling fans according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
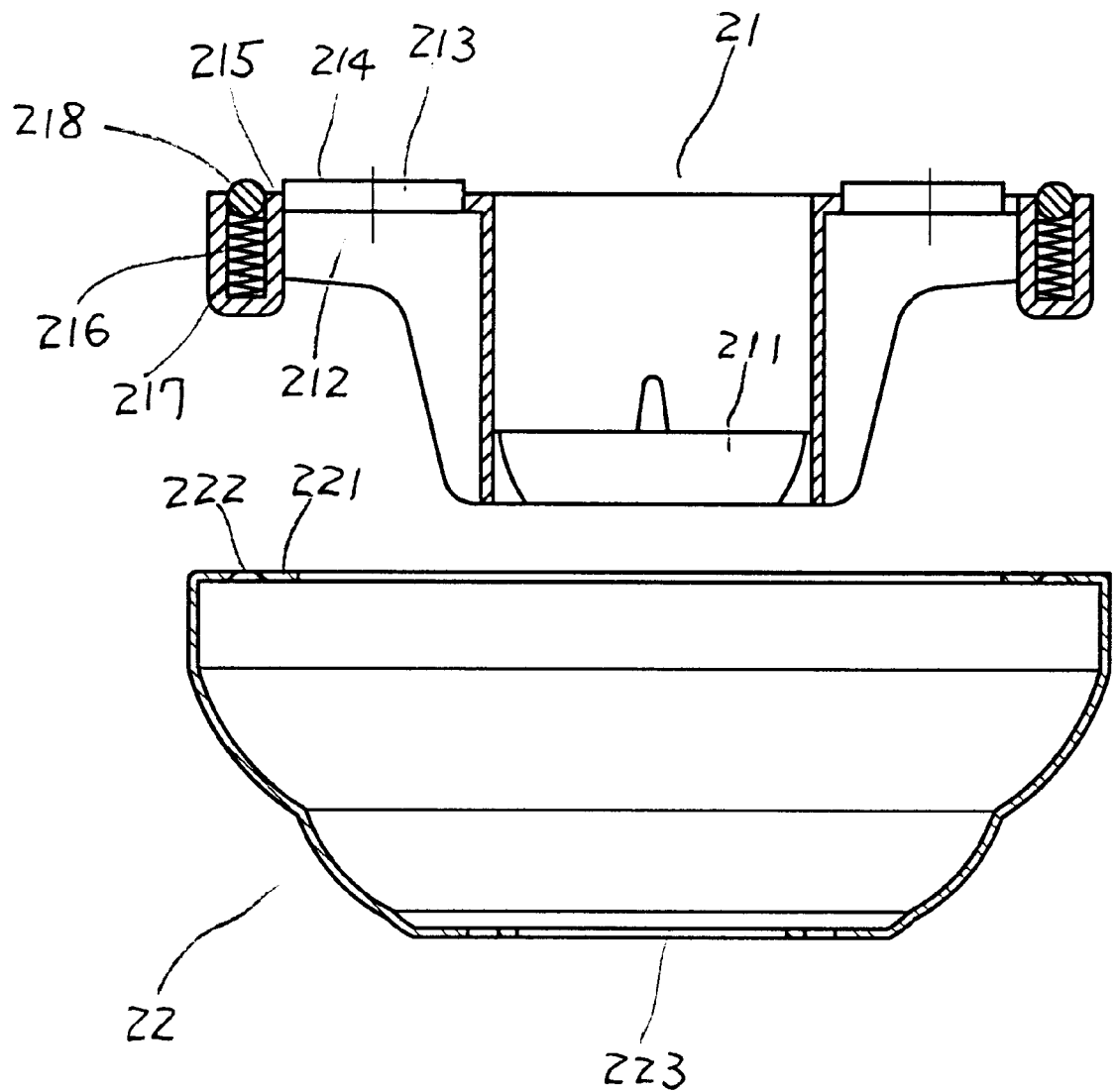
FIG. 2 is an exploded sectional view of the suspending bracket for ceiling fans according to the present invention.

With reference to the drawings and in particular to FIGS. 1 and 2, the suspending bracket for ceiling fans according to the present invention generally comprises an upper member 21 and a lower member 22. The upper member 21 is a U-shaped member having a C-shaped base 211 and two upright arms at two opposite sides of the C-shaped base 211. Each of the upright arms is provided with an outwardly extending sectorial flange 212. The sectorial flange 212 is formed with a radial slot 213 and a raised portion 214 on the top so that the rim 215 of the flange 212 is slightly lower than the raised portion 214. The sectorial flange 212 has a corner formed with a blind hole in which are fitted a 217 and a steel ball 218 so that the top of the steel ball 218 protrudes upwardly out of the blind hole.

The lower member 22 is an inverted conical member formed with two inwardly extending lugs 221 at two opposite upper edges thereof and a through hole 223 at the center thereof. Each of the lugs 221 has a hole 222 adapted to engage with the top of the steel ball 218.

Figure 3:
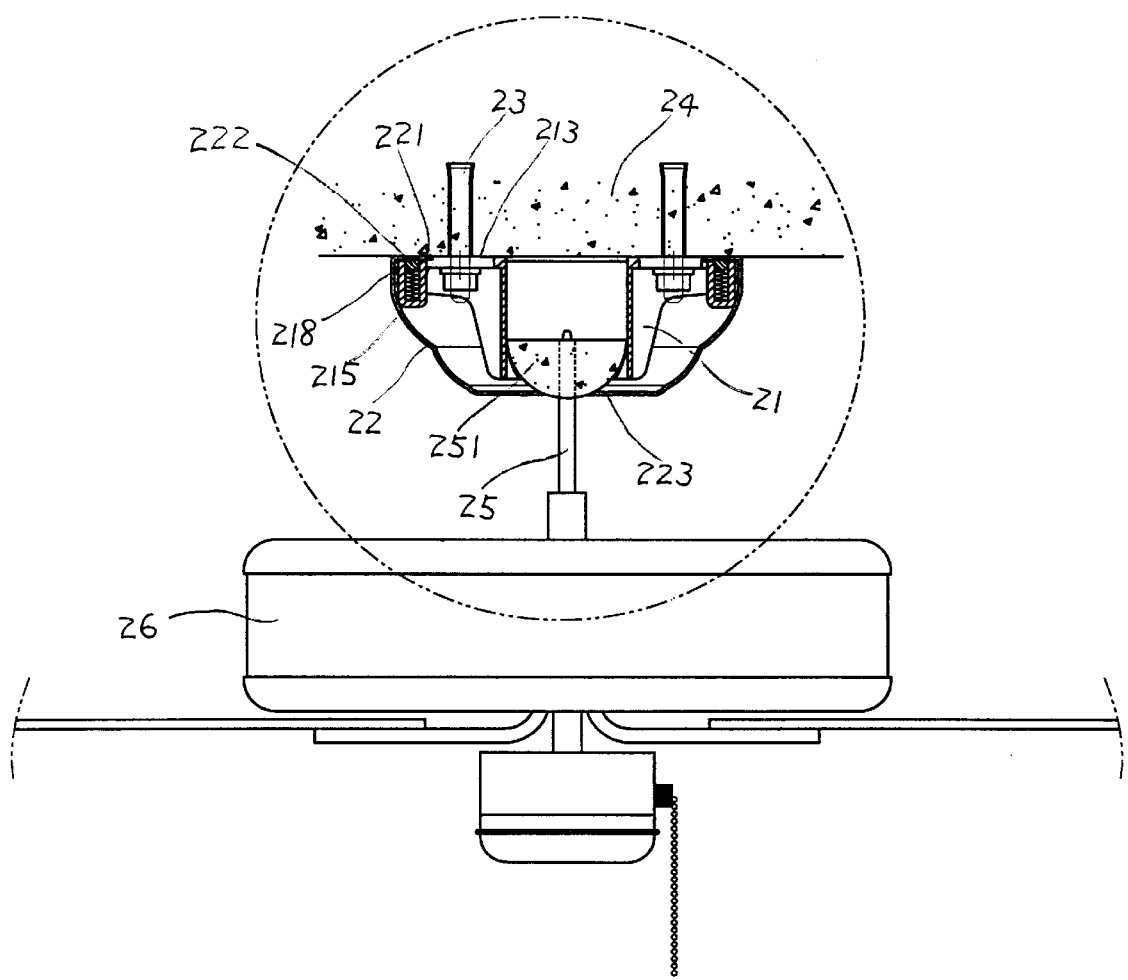
FIG. 3 is a working view of the present invention.
Figure 4:
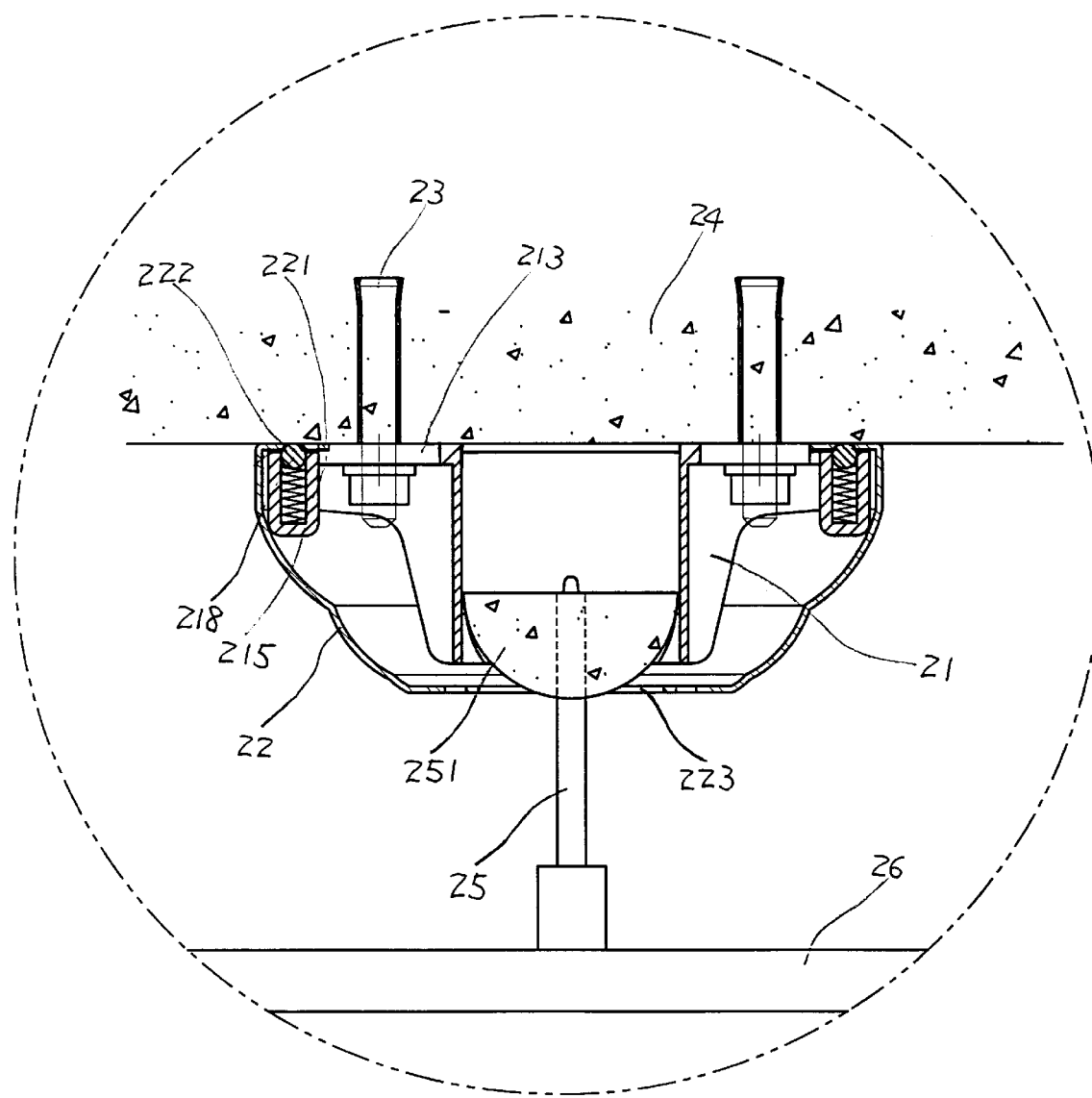
FIG. 4 is an enlarged view of a portion of FIG. 3.

Referring to FIGS. 3 and 4, when in use, the upper member 21 is first secured to the ceiling 24 by extending screws 23 through the slots 213 of the upper member 21 so that there is a clearance between the rim 215 of the flange 212 and the ceiling 24. Then, the suspending rod 25 of the ceiling fan 26 extends through the hole 223 of the lower member 22 to engage with a hemispherical block 251 which is larger than the C-shaped base 211 of the upper member 21 in diameter so that the hemispherical block 251 will not drop out of the upper member. Thereafter, the lower member 22 is moved upwardly and tuned to fit into the clearance between the sectorial flanges 215 and the ceiling 24 so that the steel balls 218 are engaged with the holes 222 thereby keeping the lower member 22 in place.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A suspending bracket for ceiling fans comprising:

a U-shaped upper member having a C-shaped base and two upright arms at two opposite sides of said C-shaped base, each of said upright arms being provided with an outwardly extending sectorial flange which is formed with a radial slot and a raised portion on the top, said sectorial flange having a corner formed with a blind hole in which is fitted a spring and a steel ball (218) so that a top of said steel ball protrudes upwardly out of said blind hole; and an inverted conical lower member formed with two inwardly extending lugs at two opposite upper edges thereof and a through hole at a center thereof, each of said lugs having a hole adapted to engage with a top of said steel ball;

whereby when in use, said U-shaped upper member is first secured to a ceiling by extending screws through said radial slots so that there is a clearance between said sectorial flange and a ceiling, a suspending rod of a ceiling fan extends through said through hole of said inverted conical lower member to engage with a hemispherical block which is larger than said C-shaped base in diameter so that said hemispherical block will not drop out of said upper member, and thereafter, said lower member is moved upwardly and turned to fit into said clearance so that said steel ball is engaged with said hole of said lugs thereby keeping said lower member in place.

* * * * *